United States Patent
Prakah-Asante et al.

(10) Patent No.: US 11,482,191 B2
(45) Date of Patent: Oct. 25, 2022

(54) ENHANCED AUGMENTED REALITY VEHICLE PATHWAY

(71) Applicant: Ford Global Technologies, LLC, Dearborn, MI (US)

(72) Inventors: Kwaku O. Prakah-Asante, Commerce Township, MI (US); Jian Wan, Novi, MI (US); Prayat Hegde, Dearborn, MI (US)

(73) Assignee: Ford Global Technologies, L.L.C, Dearborn, MI (US)

( * ) Notice: Subject to any disclaimer, the term of this patent is extended or adjusted under 35 U.S.C. 154(b) by 86 days.

(21) Appl. No.: 17/065,714

(22) Filed: Oct. 8, 2020

(65) Prior Publication Data
US 2022/0114988 A1    Apr. 14, 2022

(51) Int. Cl.
G09G 5/37 (2006.01)
G09G 5/10 (2006.01)
(Continued)

(52) U.S. Cl.
CPC .............. G09G 5/37 (2013.01); B60K 35/00 (2013.01); G01C 21/365 (2013.01);
(Continued)

(58) Field of Classification Search
None
See application file for complete search history.

(56) References Cited

U.S. PATENT DOCUMENTS 9,279,693 B2    3/2016  Hymel et al.
2015/0226965 A1*  8/2015  Kim ...................... G02B 30/30
                                                  359/462
(Continued)

FOREIGN PATENT DOCUMENTS

WO    2010040386 A1    4/2010

OTHER PUBLICATIONS

Andalibi et al, "Automatic glare Detection Via Photometric, Geometric, and Global Positioning Information", Society for Imaging Science and Technology, IS&T Symposium on Electronic Imaging, Jan. 29, 2017, 6 pages.
(Continued)

*Primary Examiner* — Jason A Pringle-Parker
(74) *Attorney, Agent, or Firm* — Brandon Hicks; Eversheds Sutherland (US) LLP

(57) ABSTRACT

A User-centric Enhanced Pathway (UEP) system may provide vehicle pathway guidance while driving using an augmented reality display system in the event of sun glare. The system uses a route observer module programmed to predict sun glare, by obtaining real-time information about the interior and exterior vehicle environment, heading, speed, and other data. The route observer module may also use an inward-facing camera to determine when the driver is squinting, which may increase the probability function that predicts when the driver is experiencing sun glare. When sun glare is predicted, the route observer sends the weighted prediction function and input signals to a decision module that uses vehicle speed, location, and user activity to determine appropriate guidance output for an enhanced pathway using an Augmented Reality (AR) module. The AR module may adjust brightness, contrast, and color of the AR information based on observed solar glare.

18 Claims, 4 Drawing Sheets

(51) Int. Cl.
*G09G 5/02* (2006.01)
*G01C 21/36* (2006.01)
*B60K 35/00* (2006.01)
*G06V 20/59* (2022.01)

(52) U.S. Cl.
CPC ............ *G06V 20/597* (2022.01); *G09G 5/02* (2013.01); *G09G 5/10* (2013.01); *B60K 2370/1529* (2019.05); *B60K 2370/166* (2019.05); *B60K 2370/167* (2019.05); *B60K 2370/177* (2019.05); *B60K 2370/349* (2019.05); *B60K 2370/37* (2019.05); *G09G 2320/066* (2013.01); *G09G 2320/0626* (2013.01); *G09G 2320/0666* (2013.01); *G09G 2354/00* (2013.01); *G09G 2380/10* (2013.01)

(56) References Cited

U.S. PATENT DOCUMENTS

| | | | |
|---|---|---|---|
| 2016/0379412 A1* | 12/2016 | Butler | G02B 27/01 345/633 |
| 2017/0076606 A1* | 3/2017 | Gupta | B60K 35/00 |
| 2017/0365101 A1* | 12/2017 | Samec | G16H 50/20 |
| 2018/0089899 A1* | 3/2018 | Piemonte | G01C 21/365 |
| 2018/0164107 A1 | 6/2018 | Yalla | |
| 2020/0073122 A1* | 3/2020 | Rothkopf | G02B 27/017 |
| 2021/0070176 A1* | 3/2021 | Rao | G09G 3/3208 |

OTHER PUBLICATIONS

Cano et al, "Heads Up Displays (HUD) In Driving", arXiv:1803.08383V1 [cs.HC], Mar. 22, 2018, 7 pages.

* cited by examiner

ENHANCED AUGMENTED REALITY VEHICLE PATHWAY

BACKGROUND

Solar glare, when driving, can present challenging situations for drivers when the glare prevents a clear view of the roadway. Solar glare can cost drivers time delay when it affects the flow of traffic and make ordinary commutes uncomfortable for the driver. Sun visors and other conventional features, such as partial windshield tinting, may not always be effective, especially when the angle of the sun may be directly in front of the vehicle during sunrise and sunset conditions. Other conventional driver assistance systems may provide path guidance using marked lanes shown on an output display to assist during such glare conditions. However, these "always on" systems may not be helpful when the displayed guidance is continuously presented on the vehicle display, even when solar glare is not present.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein include a User-centric Enhanced Pathway (UEP) system that provides pathway guidance for vehicle drivers in the event of sun glare using an Augmented Reality (AR) display system. The UEP system can include a route observer module programmed to determine and/or predict sun glare using multiple sources of input, by obtaining real-time information about the interior and exterior vehicle environment, and by obtaining operational aspects of the vehicle including heading, speed, and other factors. The route observer module may also use an inward-facing camera to determine driver eye squint, which may increase the evaluated probability of glare.

When the UEP system determines, using a weighted probability function, that the driver is experiencing solar glare, the route observer sends the environment and connectivity signals to a decision module that incorporates telematics data that can include vehicle speed, location, to determine appropriate guidance output of an enhanced pathway using an AR module. The enhanced pathway may show clear outlines for the vehicle path ahead, which may assist the driver to steer the vehicle while solar glare is present. The AR module may adjust optical properties automatically, including brightness, contrast, and color of the AR information, using user-selectable display options, and further based on the observed environmental and operational information.

Embodiments may provide a customer-centric system that incorporates an intelligent decision system that predicts and modulates vehicle pathway guidance for solar glare impact mitigation. When the system detects solar glare situations, the UEP system automatically engages the AR display system to provide an enhanced user experience.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Figure 1:
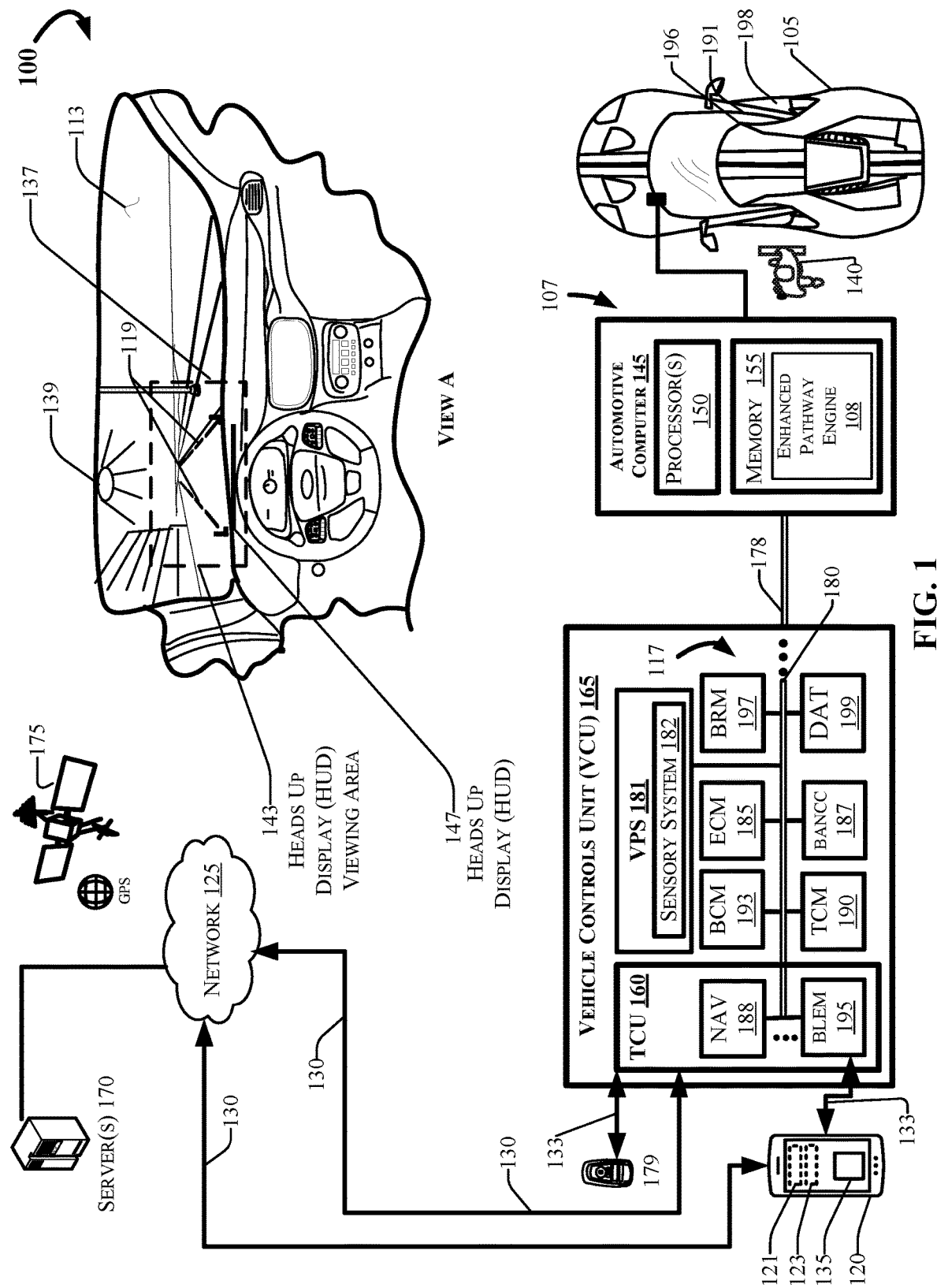
FIG. 1 depicts an example computing environment in which techniques and structures for providing the systems and methods disclosed herein may be implemented.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a performance vehicle, the vehicle 105 may take the form of another passenger or commercial automobile such as, for example, a car, a truck, a sport utility, a crossover vehicle, a van, a minivan, a taxi, a bus, a boat, a tractor, scooter, etc., and may be configured and/or programmed to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., level-5 autonomy) or in one or more partial autonomy modes. Examples of partial autonomy modes are widely understood in the art as autonomy Levels 0 through 5. A vehicle having a Level-0 autonomous automation may not include autonomous driving features. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the enhanced pathway system 107 may be configured and/or programmed to operate with a vehicle having a Level-1 or Level-2 DAT controller. Accordingly, the enhanced pathway system 107 may provide some aspects of human control to the vehicle 105, when the vehicle is configured with driver assistances technologies.

The mobile device 120 generally includes a memory 123 for storing program instructions associated with an application 135 that, when executed by a mobile device processor 121, performs aspects of the disclosed embodiments. The application (or "app") 135 may be part of the enhanced pathway system 107, or may provide information to the enhanced pathway system 107 and/or receive information from the enhanced pathway system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120 and/or the fob 179. The wireless connection(s) 133 may include various low-energy protocols including, for example, Bluetooth®, BLE, or other Near Field Communication (NFC) protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the enhanced pathway system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing an enhanced pathway program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the enhanced pathway system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the enhanced pathway system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the enhanced pathway system 107, and/or via wireless signal inputs received via the wireless connection(s) 133 from other connected devices such as the mobile device 120 and the fob 179, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the vehicle 105 may include one or more Door Access Panels (DAPs) 191 disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle. The user interface may be included as part of a Door Access Panel (DAP) 191, a wireless keypad, included as a part of the mobile device 120, or be included as part of another interface. The DAP 191, which may operate and/or communicate with the BANCC 187 or another of the ECUs 117, can include and/or connect with an interface with which a ridehail passenger, user, (or any other user such as the user 140) may input identification credentials and receive information from the system. In one aspect, the interface may be or include a DAP 191 disposed on a vehicle door 198, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

The BANCC 187 can include sensory and processor functionality and hardware to facilitate user and device authentication, and provide occupant customizations and support that provide customized experiences for vehicle occupants. The BANCC 187 may connect with a Driver Assist Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may provide Level-1 through Level-3 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). The DAT controller 199 may receive the sensor information associated with driver functions, vehicle functions, and environmental inputs, and other information. The DAT controller 199 may characterize the sensor information for identification of biometric markers stored in a secure biometric data vault (not shown in FIG. 1) onboard the vehicle 105 and/or via the server(s) 170.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory systems 182). The sensory systems 182 may be configured and/or programmed to obtain sensor data usable for biometric authentication, and for performing driver assistance operations such as, for example, active parking, trailer backup assistances, adaptive cruise control and lane keeping, driver status monitoring, and/or other features.

The computing system architecture of the automotive computer 145, VCU 165, and/or the enhanced pathway system 107 may omit certain computing modules. It should be readily understood that the computing environment depicted in FIG. 1 is an example of a possible implementation according to the present disclosure, and thus, it should not be considered limiting or exclusive.

View A depicts a driver view (driver is not shown in View A for clarity) of a roadway through a windshield 113 configured with a Heads-Up Display (HUD) 147. The HUD 147 may project an enhanced pathway 119 in a HUD viewing area 143. The enhanced pathway system 107 may determine whether the user 140 is likely experiencing discomfort while driving due to solar glare. The enhanced pathway system 107 makes this determination using various sources of data that can include whether the user 140 is squinting, and by detecting observed light incidence via one or more solar glare detection sensor(s) operative as part of the sensory system 182.

For example, the VPS 181 may determine a trajectory of light incidence, which may include light reflection off the windshield 113 and/or exterior objects such as other vehicle(s), buildings, etc. (not shown in FIG. 1). The processor(s) 150 executing the UEP engine 108 may receive an image frame (not shown in FIG. 1) of the user 140, as the user is driving the vehicle 105. The processor(s) 150 may obtain the image frame via one or more camera sensor(s) operative as part of the sensory system 182. The processor(s) may determine an eye squint status of the user based on the image frame, and determine a probability that the user 140 is experiencing solar glare.

Evaluating the probability of solar glare may include obtaining several sources of data from the VPS 181, from indices (not shown in FIG. 1) stored in the memory 155 and/or via the server(s) 170, and evaluating the various sources using a weighted predictor analysis (discussed in greater detail in the following sections). Examples of input data can include a current time of day, a current location, a current heading, vehicle speed, and other dynamically changing information. The input data may further include an index that includes a history of solar glare incidences identified and logged by the enhanced pathway system 107, which may include location information indicative of a date(s) and time(s) associated with solar glare encountered during one or more prior driving events, prior vehicle trajectory, prior location(s) of the incident(s), etc.

More particularly, the enhanced pathway system 107 may execute a route observer module (discussed hereafter with respect to FIG. 2), and determine whether the solar glare from the sun 139 exceeds a minimum threshold value for light input using one or more points of data obtained by the VPS 181.

Responsive to determining that the solar glare exceeds the minimum threshold value for light input, the enhanced pathway system 107 may conclude that the user 140 is experiencing solar glare while driving, and generate an AR display of a vehicle path (depicted in FIG. 1 as the enhanced pathway 119).

Figure 2:
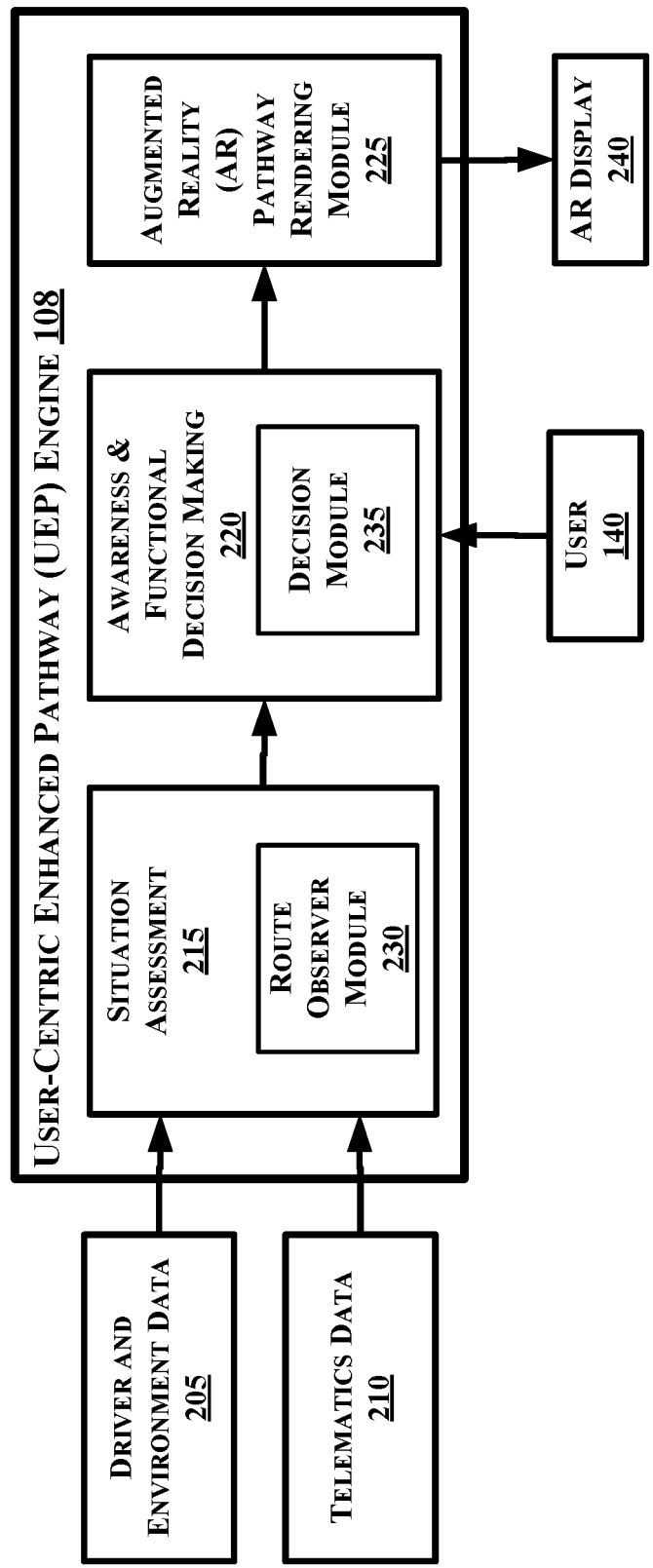
FIG. 2 depicts an example enhanced pathway engine for providing augmented reality pathway guidance in accordance with the present disclosure.

FIG. 2 depicts an example functional schematic of the User-centric Enhanced Pathway (UEP) engine 108, which may be configured and/or programmed for providing augmented reality pathway guidance in accordance with the present disclosure. The UEP engine 108 may receive data inputs that can include driver and environment data 205 and the telematics data 210, and assess the dynamically changing driving environment based on the environment data 205 and telematics data 210. The UEP engine 208 makes functional decisions for AR output based on the assessed data inputs, where the functional decisions may direct augmented reality pathway rendering on an AR display. In one embodiment, the AR display may be a heads-up display (HUD) that provides a clear view of the vehicle pathway, upon which the UEP engine 108 overlays the AR pathway, or be another AR device such as smart glasses (not shown in FIG. 1). The UEP engine 108 may also receive continued feedback from the user 140, which informs the UEP engine 108.

The UEP engine 108 may provide situation assessment 215 using a route observer module 230. The route observer module 230 may receive driver and environment data 205 from the sensory system(s) 182, from the server(s) 170, and other online resources available via the network(s) 125. The driver and environment data may include environmental factors exterior to the vehicle 105, environmental information interior to the vehicle, and driver inputs in the form of sensory information from the sensory system(s) 182.

For example, with respect to the environmental factors, the route observer module 230 may receive direct solar glare indication signal(s) from a glare sensor (not shown in FIG. 2) that detects the direct incidence of sunlight at an angle that could affect the user 140. In one aspect, the glare sensor may indicate when the sun glare is detected at one or more positions on the vehicle 105. In other aspects, the route observer module 230 may receive time of day information, celestial information that includes sun position with respect to vehicle heading, time, and day, atmospheric conditions, and other information, and use the celestial information in conjunction with vehicle position, heading, time and date information, among other possible inputs, and determine that the user 140 is likely experiencing solar glare. In other aspects, the route observer module 230 may further receive telematics data 210 from the TCU 160 that can include navigational information indicative of vehicle trajectory, vehicle speed, geographic location, etc.

Regarding the driver information, when the route observer module 230 determines that the user is currently squinting, there is a strong probability that the user 140 is experiencing solar glare while driving the vehicle 105. However, one indicator alone (e.g., the user 140 is squinting) may not provide an adequate indicator of solar glare. Accordingly, the route observer module 230 may determine whether a current probability of solar glare exceeds a minimum threshold value using a weighted series of prediction indicators, where the route observer predictor value is a weighted output of the form, $$\text{Route Observer Prediction Value} = \beta_1 * v\_index + \beta_2 * t\_index + \beta_3 * l\_index,$$

such that:

v_index is a vision glare detection component obtained from the sensory system 182;

t_index is a time of day index component that indicates when a current date and/or time is similar to a date and/or time associated with one or more prior incidents of experienced solar glare, and/or when the current time is associated with a probable incident of solar glare (e.g., during morning and evening hours); and l_index is a location index component that indicates when a current vehicle position is similar to a location associated with one or more prior incidents of experienced solar glare.

The values $\beta_1$, $\beta_2$, and $\beta_3$ are tunable weights for assigning a degree of confidence and contribution to an aggregated output (the aggregated output referred to herein as the probability of solar glare). Accordingly, the route observer module 230 may assign the tunable weights to a respective one or more of $\beta_1$, $\beta_2$, and $\beta_3$, according to varying degrees or amounts that each respective index component is observed by the enhanced pathway system 107. Although the particular weights assigned may vary according to system design, it should be appreciated that a relatively low weight may be 0.0 or 0.1 where 1.0 is the maximum weight, and the tunable weights altogether sum up to 1.0. Other weights are contemplated and possible.

For example, with respect to $\beta_1$, the route observer module 230 may assign the vision glare detection component a relatively low weight when the user 140 squints his/her eyes slightly, and for a brief period of time (e.g., 4 seconds, 10 seconds, etc.). Imagine, however, that one steps out of a dark interior building into the bright sunlight, the disposition of one's eyes would likely be tightly squinted, which may be measured by a relatively small distance between a lower eyelid and an upper eyelid as compared to a relaxed eye posture where there is no squinting due to solar glare. A measurement between the lower eyelid and the upper eyelid would be, comparatively, a strong indicator of the presence of solar glare. In such an instance, when observed, the route observer module 230 may assign a relatively higher tunable weight to $\beta_1$. The route observer module 230 may receive an image frame of the user 140, and perform a measurement of the vertical distance between the user's eyelids. In one example embodiment, the route observer module 230 may retrieve an image of the user 140 with a relaxed eye posture where there is no squinting present, and compare a measurement of the distance between upper and lower eyelids to a similar measurement of the obtained image frame to identify squinting. Those skilled in the art of face recognition may understand that there are multiple ways to obtain such information. Other methods for determining whether the user 140 is squinting while operating the vehicle 105 are contemplated and such methods are possible.

With respect to $\beta_2$, the route observer module 230 may assign the time of day index a relatively lower weight when the present time of day is different from a time of day that prior observed instances of solar glare were experienced. A different time may indicate that a present time is different from an observed time by a threshold value for time (e.g., 20 minutes different in time, 45 minutes different in time, one hour different in time, etc.). When a present time has a smaller difference (e.g., measured in minutes) from prior instances of observed solar glare, this may be a relatively stronger indicator of solar glare in the present instance. Accordingly, when observed, the route observer module 230 may assign a relatively higher tunable weight to $\beta_2$. On the other hand, a larger time value difference may indicate a relatively weaker probability of solar glare in the present instance.

With respect to $\beta_3$, the route observer module 230 may assign the location index a relatively lower weight when the distance between the present location is different from locations where prior observed instances of solar glare were experienced. A different location zone time may indicate that a present location is different from an observed location by a threshold value for distance (e.g., 0.5 km difference in distance, 1 km difference in distance, 1.5 km difference in distance, etc.). When a present location has a smaller difference (e.g., measured in km) from prior location instances of observed solar glare, this may be a relatively stronger indicator of solar glare in the present location. Accordingly, when observed, the route observer module 230 may assign a relatively higher tunable weight to $\beta_3$. On the other hand, a larger distance value difference may indicate a relatively weaker probability of solar glare in the present instance.

The route observer module 230 may selectively combine the input elements, evaluate the Route Observer Prediction Value (ROPV), and provide the ROPV to the decision module 235 for the awareness and functional decision making 220 portion of the functional schematic.

The decision module 235 may obtain the telematics data 210, including vehicle speed, vehicle location, and user activity, to set optical properties for displaying AR output using the AR pathway rendering module 225. In some aspects, the AR pathway rendering module 225 may set the optical properties based on user-selectable options that can include an automatic AR rendering of the enhanced pathway 119 (see FIG. 1), or no action (which means disabling the automatic rendering option). In one embodiment, the decision module 235 may output a user-selectable option for the enhanced output via the AR display 240, which may include the enhanced pathway 119 (as shown in FIG. 1). Alternatively, the decision module 235 may output the user-selectable option using a vehicle infotainment system (not shown in FIG. 2), and set the user-selectable option based on a selection received from the user 140. The decision module 235 may determine if the enhanced pathway 119 is to be shown based on the following expression:

If (ROPV is $>x_i$, and $V_{spd}$ is $>=y_i$, and $u_i<U_A<z_i$,

Then AFM_output=$m_i$;

such that,

ROPV is the Route Observer Prediction Value (between 0 and 1);

UA is a user activity value indicative of vehicle driving status as a sum of three independent non-weighted values, the sum of which being a value between 0 and 1 based on an accelerometer value, a steering value, and a braking action value; and AFM_output: $m_i$=(1, 2, or 0) are user selectable actions, where, 2: The system recommends an action when solar glare is detected;
1: AR rendering is automatically activated; and
0: no action.

In other aspects, the decision module 235 may determine an optical setting for the AR display of the vehicle path based on observed environmental aspects such as angle of the sun glare, and further based on static aspects such as the fixed angle of the windshield. The optical settings may include display characteristics for output of the AR enhanced roadway, including for example, a brightness setting, a contrast setting, and a color setting. Accordingly, the enhanced pathway system 107 may provide user-centric enhanced vehicle guidance when solar glare is detected, based on user-selectable and automatic features that can provide guidance only when it is needed, only when the user desires such guidance, and in an optimized mode of output such that the guidance may be comfortably viewed by the user 140 in various operational scenarios, daylight positions, etc.

Figure 3:
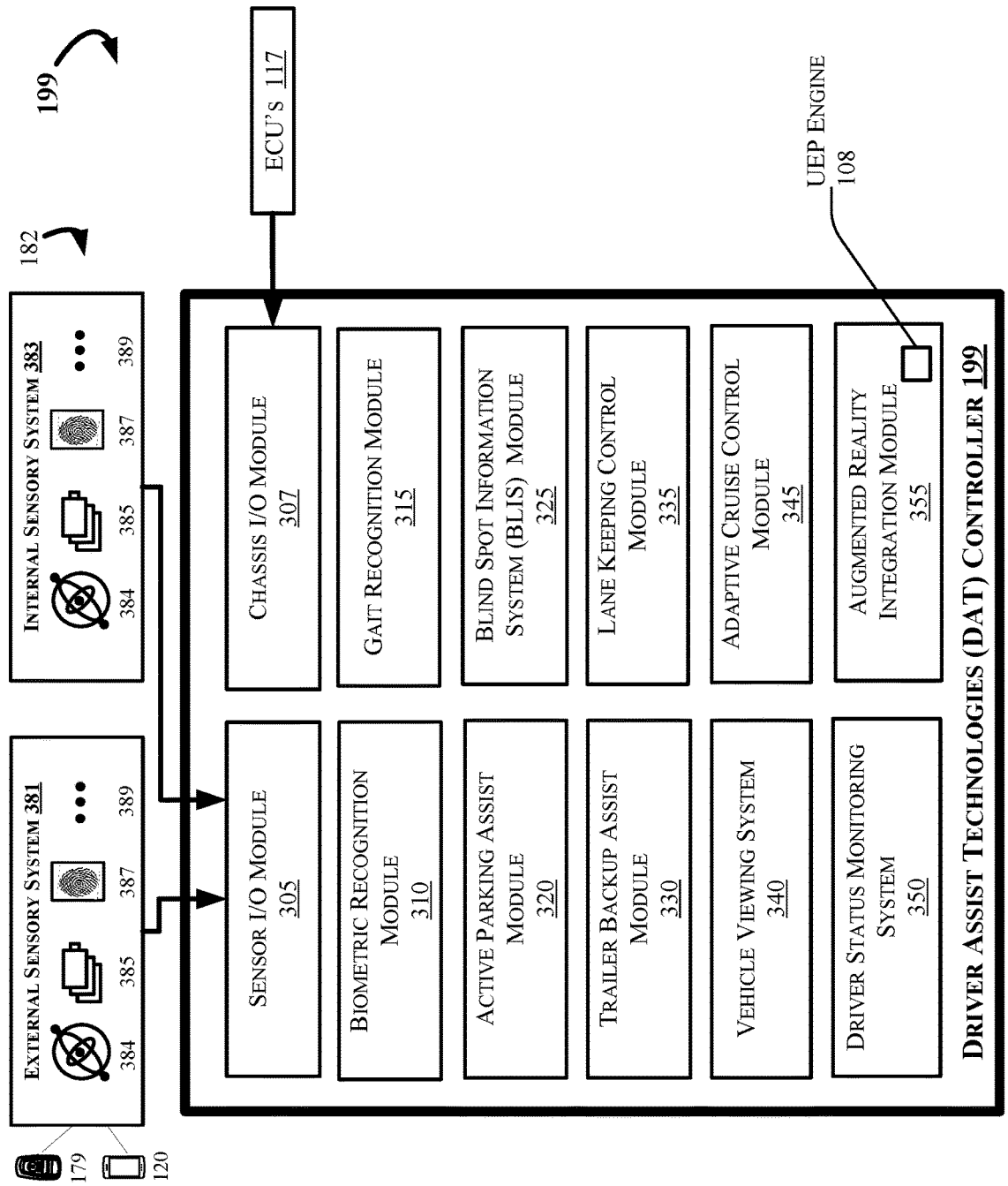
FIG. 3 illustrates an example Driver Assist Technologies (DAT) controller in accordance with the present disclosure.

FIG. 3 depicts an example DAT controller 199, in accordance with an embodiment. As explained in prior figures, the DAT controller 199 may provide automated driving and driver assistance functionality and may provide aspects of user and environmental assistance. The DAT controller 199 may facilitate user authentication, such as biometric authentication that can include face recognition, fingerprint recognition, voice recognition, gait recognition, and other unique and non-unique biometric aspects. The DAT controller 199 may further provide vehicle monitoring, and multimedia integration with driving assistance.

In one example embodiment, the DAT controller 199 may include a sensor I/O module 305, a chassis I/O module 307, a Biometric Recognition Module (BRM) 310, a gait recognition module 315, an active parking assist module 320, a blind spot information system (BLIS) module 325, a trailer backup assist module 330, a lane keeping control module 335, a vehicle viewing system module 340 (including, for example, one or more camera(s)), an adaptive cruise control module 345, a driver status monitoring system 350, and an augmented reality integration module 355, among other systems. It should be appreciated that the functional schematic depicted in FIG. 3 is provided as an overview of functional capabilities for the DAT controller 199, and is not intended to be limiting. In some embodiments, the vehicle 105 may include more or fewer modules and control systems.

The DAT controller 199 can obtain input information via the sensory system(s) 182, which may include the external sensory system 381 and the internal sensory system 383 sensors disposed on the vehicle 105 interior and/or exterior, and via the chassis I/O module 307, which may be in communication with the ECUs 117. The DAT controller 199 may receive the sensor information associated with driver functions and biometric inputs such as eye squint status, environmental inputs, and other information from the sensory system(s) 182.

In other aspects, the DAT controller 199 may also be configured and/or programmed to facilitate and/or control Level-1 and/or Level-2 driver assistance actions when the vehicle 105 includes those automated driving features. The DAT controller 199 may connect with and/or include a Vehicle Perception System (VPS) 181 as shown in FIG. 1, which may include internal and external sensory systems (collectively referred to as sensory systems 182). The sensory systems 182 may be configured and/or programmed to obtain other sensor data usable for biometric authentication, and for performing driver assistance operations such as, for example, active parking, trailer backup assistance, adaptive cruise control and lane keeping, driver status monitoring, and/or other features.

The DAT controller 199 may be configured and/or programmed to provide biometric authentication control for the vehicle 105, including, for example, facial recognition, fingerprint recognition, voice recognition, and/or provide other authenticating information associated with characterization, identification, occupant appearance, occupant status, and/or verification for other human factors such as gait recognition, body heat signatures, eye tracking, etc. The DAT controller 199 may obtain the sensor information from an external sensory system 381, which may include sensors disposed on a vehicle exterior and in devices connectable with the vehicle 105 such as the mobile device 120 and/or the fob 179.

The DAT controller 199 may further connect with the sensory system 182, which can include the internal sensory system 383, which may include any number of sensors configured in the vehicle interior (e.g., the vehicle cabin, which is not depicted in FIG. 3). The external sensory system 381 and internal sensory system 383 can connect with and/or include one or more inertial measurement units (IMUs) 384, camera sensor(s) 385, fingerprint sensor(s) 387, and/or other sensor(s) 389, and obtain biometric data usable for characterization of the sensor information for identification of biometric markers stored in a secure biometric data vault (not shown in FIG. 3) onboard the vehicle 105, and to obtain environmental data for providing driver assistance features. The DAT controller 199 may obtain, from the sensory systems 182, sensory data that can include external sensor response signal(s).

Figure 4:
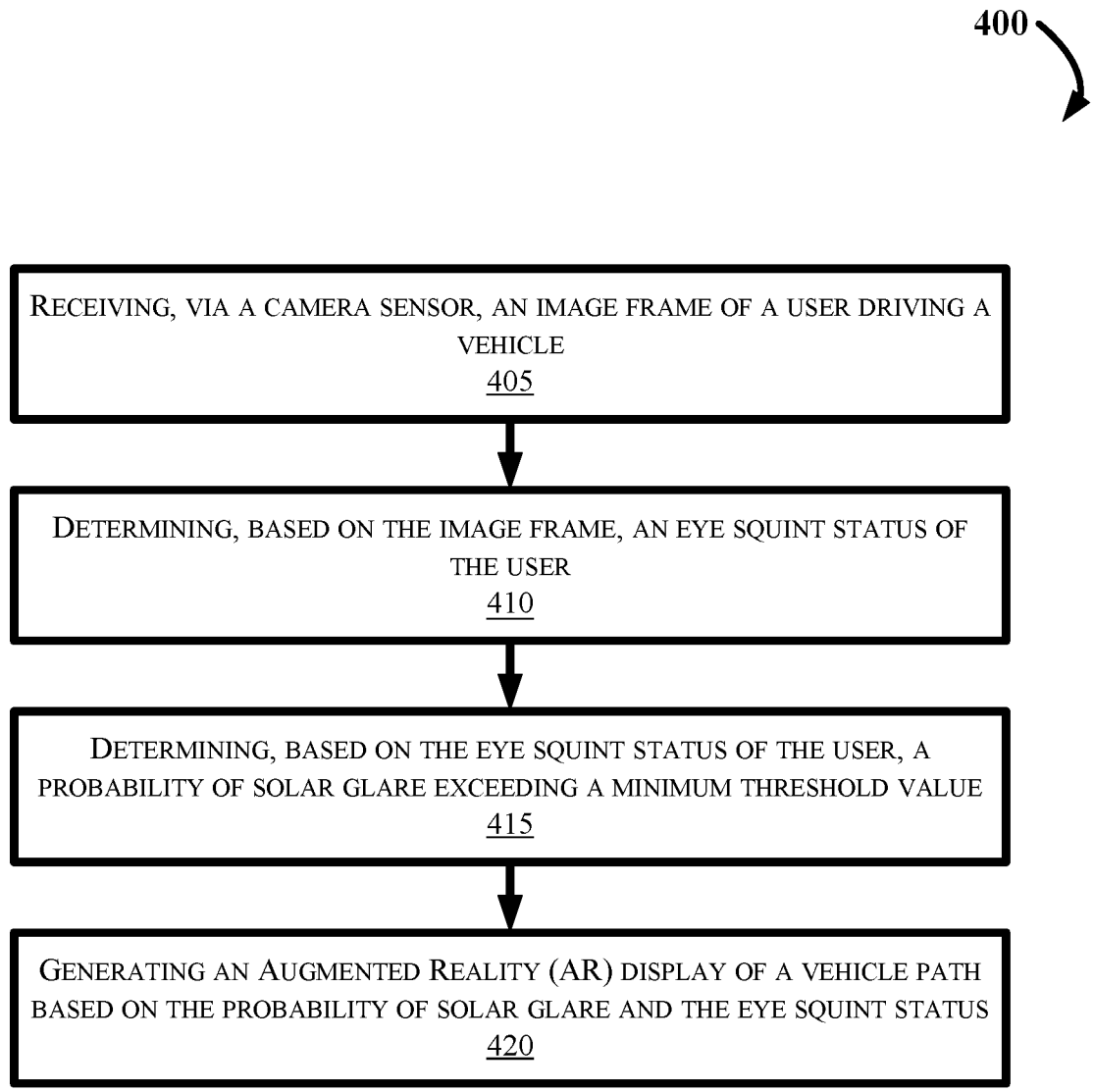
FIG. 4 depicts a flow diagram in accordance with the present disclosure.

FIG. 4 is a flow diagram of an example method 400 for providing augmented reality (AR) vehicle guidance for solar glare mitigation in a vehicle, according to the present disclosure. FIG. 4 may be described with continued reference to prior figures, including FIGS. 1-3. The following process is exemplary and not confined to the steps described hereafter. Moreover, alternative embodiments may include more or less steps, that are shown or described herein, and may include these steps in a different order than the order described in the following example embodiments.

Referring first to FIG. 4, at step 405, the method 400 may commence with receiving, via a camera sensor, an image frame of a user driving a vehicle.

At step 410, the method 400 may further include determining, based on the image frame, and via a processor, an eye squint status of the user. This step may include receiving a video feed or a single image frame of the user, and evaluating the disposition of the user's eyes to determine if the user is squinting, which may indicate the presence of solar glare.

At step 415, the method 400 may further include determining, based on the eye squint status of the user, a probability of solar glare exceeding a minimum threshold value. This step may include determining a vehicle speed, determining a location of the vehicle and a vehicle trajectory, and selecting a visual comfort mode based on the vehicle speed and vehicle trajectory.

At step 420, the method 400 may further include generating an AR display of a vehicle path based on the probability of solar glare and the eye squint status. This step may include generating the AR display of the vehicle path based on the visual comfort mode, which may include an optical setting for the AR display of the vehicle path comprising a brightness setting, a contrast setting, and a color setting. The vehicle path may include an animation or graphic displayed on a HUD device associated with the vehicle windshield, via one or more AR display devices (wearables) such as AR glasses, or via another AR device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for providing augmented reality (AR) vehicle guidance for solar glare mitigation in a vehicle, comprising:
   receiving, via a camera sensor, an image frame of a user driving the vehicle;
   determining, based on the image frame, an eye squint status of the user;
   determining a probability of a solar glare exceeding a minimum threshold value, wherein the probability of the solar glare is determined based on the eye squint status of the user and a weighted series of prediction indicators comprising a time index indicative of a time of day and a weight associated with a proximity of the time of day to a present time of day; and
   generating, based on the probability of the solar glare and the eye squint status, an AR display of a vehicle path.

2. The method according to claim 1, further comprising:
   determining a vehicle speed;
   determining a location of the vehicle and a vehicle trajectory;
   selecting, based on the vehicle speed and the vehicle trajectory, a visual comfort mode; and
   generating, based on the visual comfort mode, the AR display of the vehicle path.

3. The method according to claim 2, wherein the visual comfort mode comprises an optical setting for the AR display of the vehicle path comprising a brightness setting.

4. The method according to claim 2, wherein the visual comfort mode comprises an optical setting for the AR display of the vehicle path comprising a contrast setting.

5. The method according to claim 2, wherein the visual comfort mode comprises an optical setting for the AR display of the vehicle path comprising a color setting.

6. The method according to claim 1, wherein the probability of the solar glare is further based on a glare indicator signal from a vehicle vision system and a duration associated with the eye squint status of the user.

7. The method according to claim 1, wherein the weight is a first weight, and wherein the probability of the solar glare is further based on a second weight associated with a history of solar glare incidences comprising location information indicative of a date and a time associated with the solar glare incidences, a location associated with the solar glare incidences, and a vehicle trajectory associated with the solar glare incidences.

8. A system for providing augmented reality (AR) vehicle guidance for solar glare mitigation in a vehicle, comprising:
   a processor; and
   a memory for storing executable instructions, the processor programmed to execute the instructions to:
      receive, via a camera sensor, an image frame of a user driving the vehicle;
      determine, based on the image frame, an eye squint status of the user;
      determine a probability of a solar glare exceeding a minimum threshold value, wherein the probability of the solar glare is determined based on the eye squint status of the user and a weighted series of prediction indicators comprising a time index indicative of a time of day and a weight associated with a proximity of the time of day to a present time of day; and
      generate, based on the probability of the solar glare and the eye squint status, an AR display of a vehicle path.

9. The system according to claim 8, wherein the processor is further programmed to execute the instructions to:
   determine a vehicle speed;
   determine a location of the vehicle and a vehicle trajectory;
   select, based on the vehicle speed and the vehicle trajectory, a visual comfort mode; and
   generate, based on the visual comfort mode, the AR display of the vehicle path.

10. The system according to claim 9, wherein the visual comfort mode comprises an optical setting for the AR display of the vehicle path comprising a brightness setting.

11. The system according to claim 9, wherein the visual comfort mode comprises an optical setting for the AR display of the vehicle path comprising a contrast setting.

12. The system according to claim 9, wherein the visual comfort mode comprises an optical setting for the AR display of the vehicle path comprising a color setting.

13. The system according to claim 8, wherein the probability of the solar glare is further based on a glare indicator signal from a vehicle vision system and a duration associated with the eye squint status of the user.

14. The system according to claim 8, wherein the weight is a first weight, and wherein the probability of the solar glare is further based on a second weight associated with a history of solar glare incidences comprising location information indicative of a date and a time associated with the solar glare incidences, a location associated with the solar glare incidences, and a vehicle trajectory associated with the solar glare incidences.

15. A non-transitory computer-readable storage medium in a vehicle control module, the computer-readable storage medium having instructions stored thereupon which, when executed by a processor, cause the processor to:
   receive, via a camera sensor, an image frame of a user driving a vehicle;
   determine, based on the image frame, an eye squint status of the user;
   determine a probability of a solar glare exceeding a minimum threshold value, wherein the probability of the solar glare is determined based on the eye squint status of the user and a weighted series of prediction indicators comprising a time index indicative of a time of day and a weight associated with a proximity of the time of day to a present time of day; and
   generate, based on the probability of the solar glare and the eye squint status, an AR display of a vehicle path.

16. The non-transitory computer-readable storage medium according to claim 15, having further instructions stored thereupon to:
   determine a vehicle speed;
   determine a location of the vehicle and a vehicle trajectory;
   select, based on the vehicle speed and the vehicle trajectory, a visual comfort mode; and
   generate, based on the visual comfort mode, the AR display of the vehicle path.

17. The non-transitory computer-readable storage medium according to claim 16, wherein the visual comfort mode comprises an optical setting for the AR display of the vehicle path comprising a brightness setting, a color setting, and/or a contrast setting.

18. The non-transitory computer-readable storage medium according to claim 15, wherein the weight is a first weight, and wherein the probability of the solar glare is further based on a glare indicator signal from a vehicle vision system and a duration associated with the eye squint status of the user, and/or a second weight associated with a history of solar glare incidences comprising location information indicative of a date and a time associated with the solar glare incidences, a location associated with the solar glare incidences, and a vehicle trajectory associated with the solar glare incidences.

* * * * *